United States Patent
Johnson et al.

(10) Patent No.: US 6,908,230 B2
(45) Date of Patent: Jun. 21, 2005

(54) SHAFT LOCKING DEVICE FOR BEARING ASSEMBLIES

(75) Inventors: James P. Johnson, St. Charles, IL (US); Eric Puleo, Cortland, IL (US); Kevin Feerick, Wheaton, IL (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 10/025,076

(22) Filed: Dec. 18, 2001

(65) Prior Publication Data

US 2004/0120621 A9 Jun. 24, 2004

Related U.S. Application Data

(62) Division of application No. 09/805,804, filed on Mar. 13, 2001, now Pat. No. 6,336,748, which is a division of application No. 09/235,691, filed on Jan. 22, 1999, now Pat. No. 6,200,039, which is a division of application No. 08/798,284, filed on Feb. 7, 1997, now Pat. No. 5,863,137.

(51) Int. Cl.$^7$ .............................................. F16C 19/06
(52) U.S. Cl. ..................................................... 384/537
(58) Field of Search .................................. 384/537, 539, 384/585, 584, 510

(56) References Cited

U.S. PATENT DOCUMENTS

| | | | |
|---|---|---|---|
| RE17,838 E | 10/1930 | Gayman | |
| 1,898,469 A | 2/1933 | Tonsor | |
| 2,136,819 A | 11/1938 | Large | |
| 2,168,469 A | 8/1939 | Brouwer | |
| 2,650,867 A | 9/1953 | Spieth | |
| 3,172,667 A | 3/1965 | Baker et al. | |
| 3,276,828 A | 10/1966 | Mansfield | |
| 3,304,140 A | 2/1967 | Hornigold | |
| 3,397,021 A | 8/1968 | Fitzsimmons | |
| 3,428,379 A | 2/1969 | Readman | |
| 3,938,901 A | 2/1976 | Howe, Jr. | |
| 4,537,519 A | 8/1985 | La Rou et al. | |
| 4,575,265 A | 3/1986 | Tooley | |
| 4,728,202 A | 3/1988 | LaRou | |
| 4,728,203 A | 3/1988 | Okamoto et al. | |
| 5,863,137 A | 1/1999 | Johnson et al. | |
| 6,036,372 A | 3/2000 | Okamoto | |
| 6,129,456 A | * 10/2000 | Okamoto | 384/537 |

FOREIGN PATENT DOCUMENTS

| | | |
|---|---|---|
| FR | 513495 | 4/1920 |
| FR | 513496 | 4/1920 |

* cited by examiner

Primary Examiner—Lenard A. Footland
(74) Attorney, Agent, or Firm—McDonnell Boehnen Hulbert & Berghoff

(57) ABSTRACT

A bearing assembly wherein the inner diameter of the slotted compressible annular locking collar is provided with a protrusion which extends radially inwardly, and finger extensions of the inner ring are provided with a recessed groove which extends at least partially along the collective outer annular surface of the finger extensions. When the locking collar is disposed about the finger extensions of the inner ring, the protrusion is disposed within the recessed groove to retain the locking collar on the inner ring. The inner ring finger extensions and the locking collar are relatively sized such that when they are in their free states, the inner diameter of the protrusion is slightly smaller than the outer diameter of the recessed groove, such that the collar may be snapped over the finger extensions and into proper position on the inner ring prior to installation on a shaft. The protrusion may be an integrally formed part of the locking collar or a separate resilient member. In one embodiment, the locking collar and finger extensions are formed with cooperating threads.

4 Claims, 3 Drawing Sheets

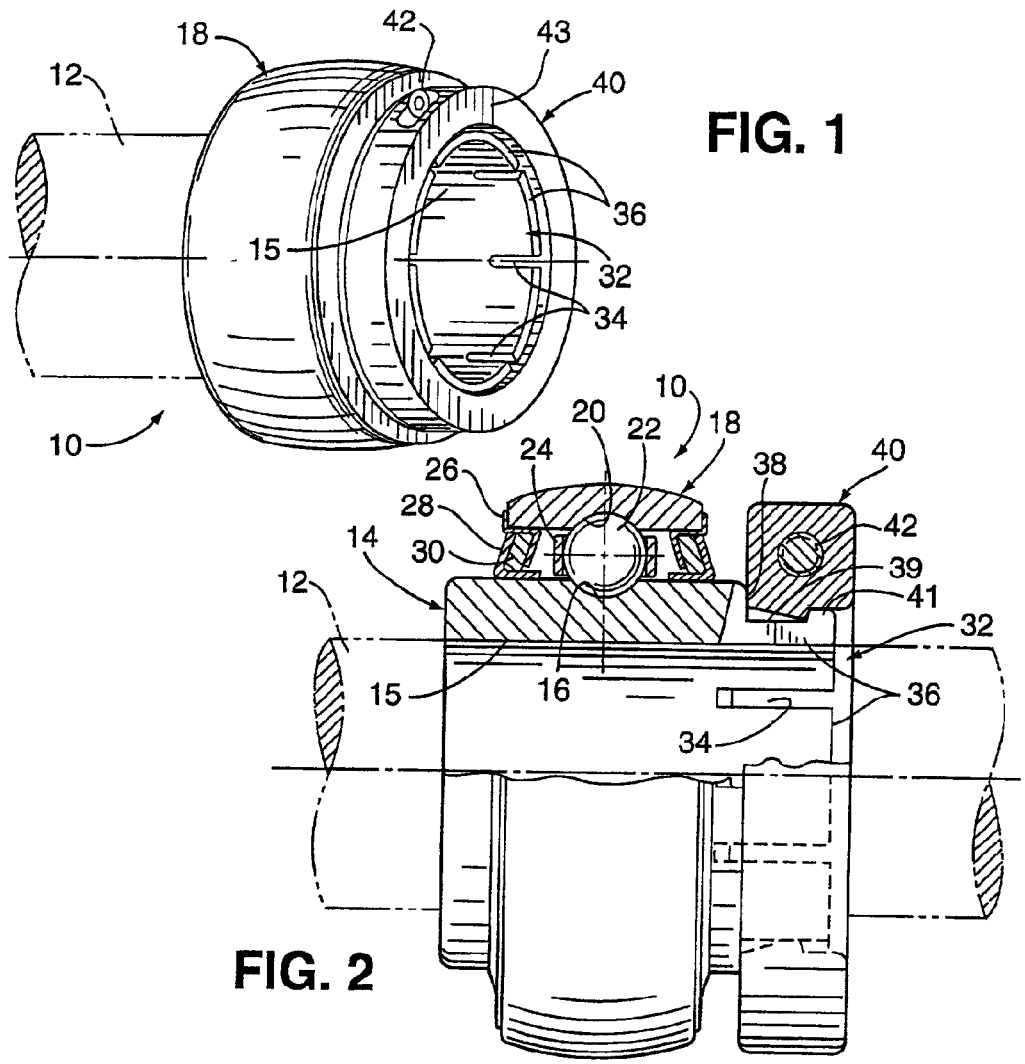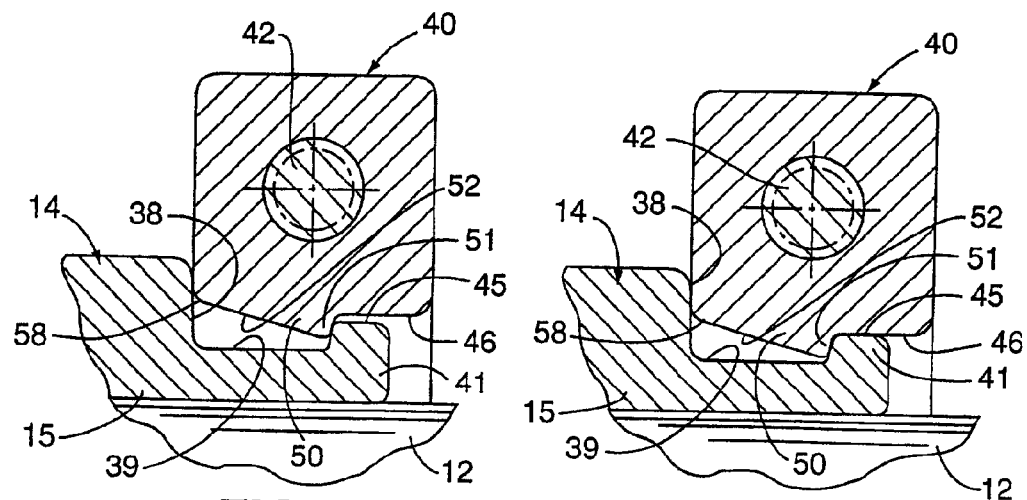

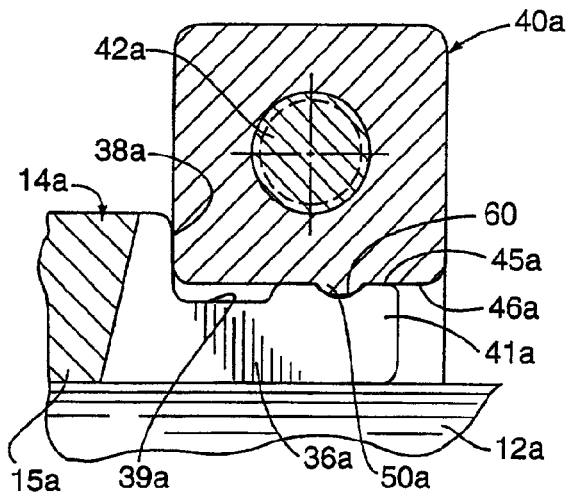
FIG. 5
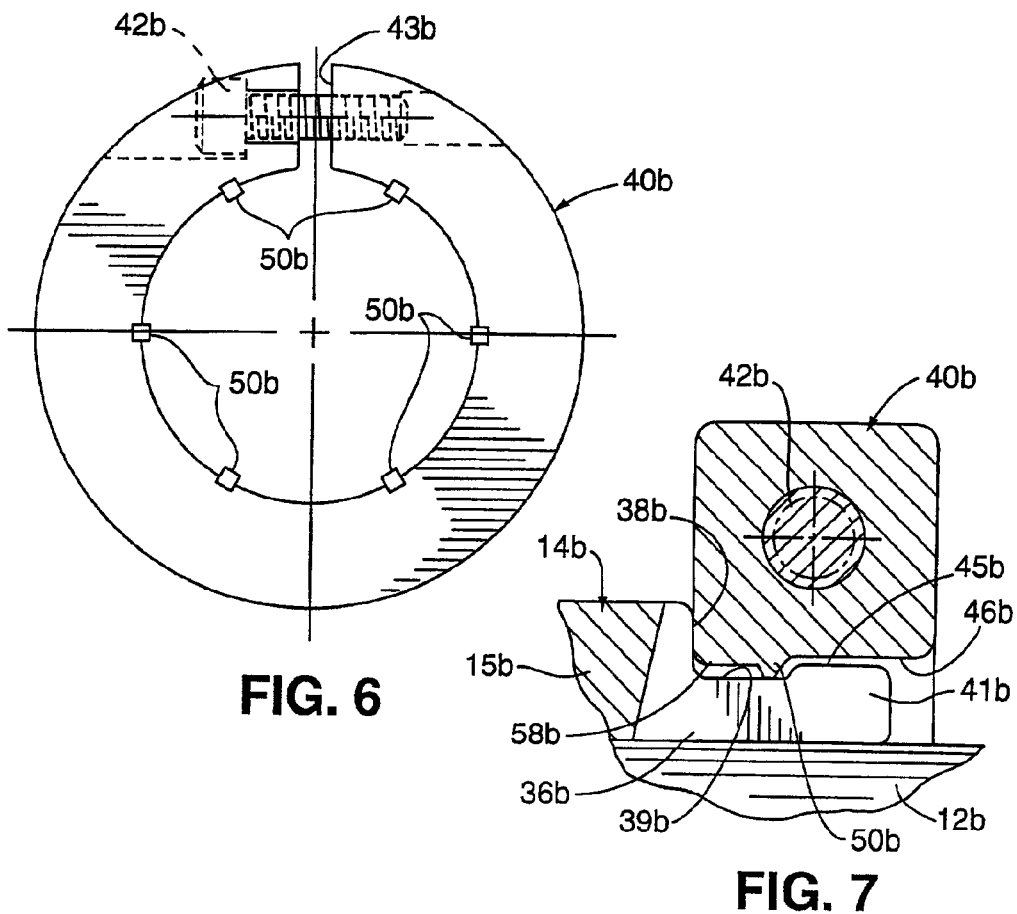
FIG. 6
FIG. 7

SHAFT LOCKING DEVICE FOR BEARING ASSEMBLIES

This is a divisional application of U.S. patent application Ser. No. 09/235,691, filed Jan. 22, 1999, now U.S. Pat. No. 6,200,039, which is a divisional application of U.S. application Ser. No. 08/798,284, filed on Feb. 7, 1997, now U.S. Pat. No. 5,863,137.

FIELD OF THE INVENTION

The present invention relates to bearing assemblies, and more particularly, to a bearing assembly having improved means for securing the inner bearing ring of the assembly onto a shaft.

BACKGROUND OF THE INVENTION

Various arrangements are known in the art for securing the inner bearing ring of a bearing assembly onto a rotating shaft. Such arrangements have included shaft engaging set screws and shaft-surrounding locking collars. Such locking collars include locking or tightening means, generally in the form of one or more locking screws. In the so-called SKWEZLOC® arrangement disclosed in U.S. Pat. Nos. 4,537,519 and 4,728,203, the inner ring has finger extensions which, when compressed with a screw operated locking collar, tightly grip and hold the shaft. This finger extension/locking collar combination enhances the concentricity of the inner ring with the shaft and facilitates rotation of the shaft at higher speeds.

Arrangements which utilize shaft-surrounding locking collars, however, have various shortcomings. Inasmuch as the locking collar is a separate component from the inner bearing ring, the locking collar can become separated from the bearing assembly and lost or mislaid. Moreover, if the locking collar is not properly disposed on the inner bearing ring during assembly, the collar may not adequately secure the inner bearing ring to the shaft. For example, if the collar is slightly cocked on the inner bearing as it is tightened, it will align itself after the shaft is rotated. This causes the collar to become loose on the inner bearing, resulting in slippage between the inner bearing ring and the shaft when subjected to radial and/or axial loads. The problems of mounting and retaining such locking collars are compounded if the collar comprises a multiplicity of segments which must be properly positioned and tightened during installation.

SUMMARY OF THE INVENTION

In overcoming these problems with the prior art there is provided a bearing assembly wherein the locking collar may be efficiently pre-assembled on the inner bearing ring at the factory and remain properly positioned on the inner bearing ring during installation onto a shaft. In this way, the collar may not be readily separated from the bearing assembly and mislaid. Moreover, this preassembly ensures that the collar is in proper position on the inner bearing ring which facilitates subsequent reliable installation of the collar and inner bearing ring on the shaft.

In accomplishing these objectives, the inner diameter of the compressible annular locking collar is provided with a protrusion which extends radially inwardly. When the locking collar is disposed about the finger extensions of the inner ring, the protrusion is disposed within a recessed groove which extends at least partially along the collective outer annular surface defined by the finger extensions for precisely locating and orienting the collar. According to a feature of the invention, when the inner ring finger extensions and the locking collar are in their free states, the inner diameter of the protrusion is slightly smaller than the outer diameter of the finger extension groove. In this way, the collar may be snapped over the finger extensions and into proper position on the inner ring prior to installation on a shaft, i.e., in the factory. The locking collar then remains in proper position on the finger extensions as the bearing assembly subsequently is installed onto the shaft. In one embodiment, a one-piece locking collar body has an integrally formed protrusion adapted for snap action engagement with a finger extension recess, in another embodiment the locking collar has separate resilient O-ring engageable with the finger extension recess, and in another embodiment, the locking collar and finger extensions are formed with screws which permit threaded advancement of the locking collar into preassembled position. In each case, following preassembly of the bearing assembly an a shaft, a locking screw may thereafter be tightened to deform the finger extensions into secure engagement with the shaft.

These and other features and advantages of the invention will be more readily apparent upon reading the following description of preferred exemplified embodiments of the invention and upon reference to the accompanying drawings wherein:

BRIEF DESCRIPTION OF THE DRAWINGS

FIG. 1 is a perspective of a bearing assembly in accordance with the present invention;

FIG. 2 is an enlarged side elevational view of the bearing assembly shown in FIG. 1, partially cut away;

FIG. 3 is a enlarged fragmentary section of a portion of the bearing assembly of FIGS. 1 and 2, showing the relative position of the inner ring finger extensions and the locking collar as the latter is snapped over the ring extensions;

FIG. 4 is a view similar to FIG. 3 showing the relative position of the ring finger extensions and locking collar upon tightening of the collar;

FIG. 5 is an enlarged cross sectional view of a portion of a bearing assembly according to a second embodiment of the invention;

FIG. 6 is an enlarged cross sectional view of a portion of a bearing assembly according to a third embodiment of the invention;

FIG. 7 is a plan view of the locking collar shown in FIG. 6.

Figure 8:
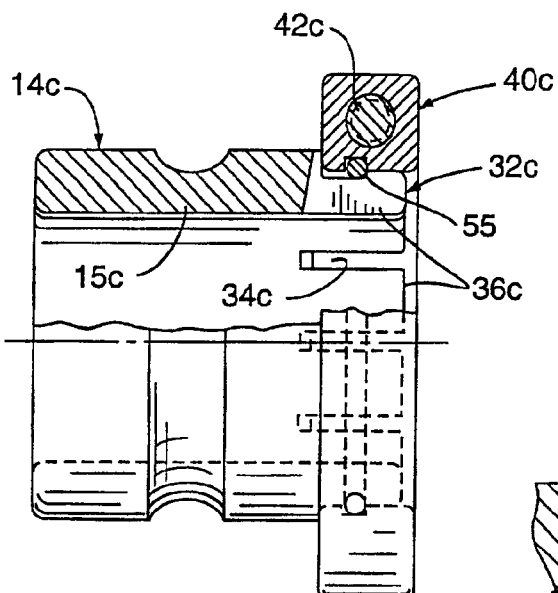
FIG. 8 is a fragmentary section of an alternative locking collar mounting and retaining arrangement according to the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENTS

Referring now more particularly to FIGS. 1 and 2 of the drawings, there is shown an illustrative bearing assembly 10 embodying the present invention mounted on a shaft 12 (shown in phantom). The bearing assembly 10 includes an annular inner ring 14 having a grooved raceway 16 formed in a main body portion 15 thereof. Surrounding the inner ring 14 in spaced relation thereto is an annular outer ring 18 having a grooved raceway 20 disposed in opposed relationship to the inner raceway 16, the raceways 16, 20 serving to receive in nesting relationship a plurality of spaced balls or rolling elements 22. The rolling elements 22 in this case are disposed in rolling element pockets of a conventional cage 24. Preferably, the inner and outer raceways are wear hardened for extending the life of the bearing.

While not illustrated in the drawings, the assembly 10 includes a convention means for lubricating movement of the rolling elements 22. To maintain lubrication to the rolling elements 22, the space between the inner and outer bearing rings 14, 18 is sealed by annular inner and outer flingers 26, 28 with annular seals 30 therebetween. The inner and outer flingers 26, 28 are press-fitted on the inner and outer bearing rings 14, 18, respectively, on either side of rolling element cage 22.

To facilitate mounting of the bearing assembly 10 to the shaft 12, the inner bearing ring 14 is provided with a compressible annular portion 32 having a reduced diameter and which extends from the main body portion 15. To maximize radial compression of the extended annular portion 32, the portion 32 is preferably provided with a plurality of axial slots 34 which define a plurality of finger-like extensions 36 from a shoulder 38 of the main body portion 15 of inner ring 14. The slots 34 preferably are parallel to the axis of rotation of the shaft 12 to provide the most desirable attachment and performance characteristics.

The finger extensions 36 in this case are formed with an area of reduced thickness defined by a groove or recess 39 which extends annularly around the outer periphery of the finger extensions 36. This area of reduced thickness or bending groove 39, which is spaced axially inwardly from the distal ends of the finger extensions 36, permits a slight bending of the finger extensions 36 to facilitate securing the inner ring 14 to the shaft 12, as disclosed in U.S. Pat. No. 4,537,519. The groove 39 in this case defines raised lip 41 having an outer cylindrical surface 45 at the ends of the finger extensions 36.

For securing the bearing assembly 10 on the shaft 12, a one piece locking collar 40 is concentrically disposed about the extended annular portion 32. To permit tightening of the locking collar 40 about the shaft 12, a locking screw 42 is threaded tangentially through the collar 40 normal to a slot or gap 43 between the ends of the collar. The screw 42 is recessed into the locking collar 40 and preferably receives an hexagonal wrench (not shown). It will be appreciated that, by tightening the screw 42, the ends of the locking collar 40 at the slot or gap 43 (see FIG. 1) are drawn toward one another to effectively reduce the inner diameter of the collar 40 and to radially compress the finger extensions 36 of the inner ring 14 into secure engagement with the shaft 12.

To facilitate proper positioning and alignment of the collar 40 onto the inner ring 14, the breadth of collar 40 is preferably substantially equal or, as shown in the embodiments illustrated, slightly larger than the length of the finger extensions 36 to ensure that optimum locking force will be applied to the finger extensions 36. The breadth of the bending groove 39 in the finger extensions 36 preferably is on the order of one half the length of the finger extensions 36 to one half the breadth of the locking collar 40.

The collar 40 may be properly aligned or "squared" by exerting a force on an outer side of the collar 40 to ensure that the collar 40 is fully seated against the shoulder 38 of the inner ring 14. In this way, one can visually determine if the collar 40 and the distal ends of the finger extensions 36 are in the appropriate physical relationship. It will be appreciated by one skilled in the art that if the screw 42 is tightened when the collar 40 is not yet fully or properly seated on the inner ring, the collar 40 may become loose during rotation of the shaft. As a result, when the collar 40 eventually seats itself during use, the collar 40 will no longer provide the required locking force.

In accordance with the invention, the locking collar 40 has an inwardly directed protrusion adapted for locating and positively retaining the locking collar in properly oriented mounted position on the inner bearing ring for reliable long term usage. To this end, in the illustrated embodiment, as shown in FIGS. 3 and 4, the locking collar has an inner cylindrical mounting surface 46 adapted for mounting on the cylindrical surface 45 of the finger extension lips 41 and an integrally formed inwardly directed wedge shaped protrusion 50 which defines a locking ledge 51 and an inclined camming surface 52 which tapers radially outwardly from the ledge 51. The distance between the locking ledge 51 and the axial side of the clamping collar 40 positioned against inner ring shoulder 38 corresponds substantially to the axial length of the groove 39 such that upon positioning of the protrusion into the groove 39, the collar 40 is precisely located and retained within the groove 39 between the shoulder 38 of the inner bearing ring and the upturned lips 41 of the finger extensions 36. Hence, the groove 39 in this case serves a dual function as a weakening recess for the finger extensions and a lock receiving and orienting groove for the collar 40.

In keeping with the invention, the locking collar 40 is adapted for efficient snap action preliminary factory assembly onto the inner ring 14. To this end, the protrusion 50 of the clamping collar 40 has an inner diameter that is slightly less than the outer diameter of the finger extension lips 41. In order to assemble the collar 40, it is first positioned into slightly surrounding relation to the finger extension lip 41. To this end, a lead edge 58 of the camming surface 52 is slightly larger than the outer diameter of the finger extension lips 41. The collar 40 may then be advanced onto the finger extensions 36, with the angled or camming surface 52 of the protrusion advancing along the finger extensions 36 slightly flexing the fingers in an inward direction and the collar outwardly. As the protrusion 50 moves past the finger extension lip 41, the finger extensions 36 and the locking collar 40 return or "snap back" to their original conditions, as shown in FIG. 3, automatically locating and orienting the locking collar 40 in position on the inner ring and positively preventing its removal.

In this way, the bearing assembly 10 may be preassembled in the factory and shipped to a customer or installation site with the collar 40 properly oriented. When the bearing assembly 10 is subsequently mounted on a shaft, the locking collar screw 42 simply may be tightened to securely lock the assembly on the shaft, essentially eliminating the possibility of misplacing the collar 40 during handling or incorrectly positioning the collar onto the inner bearing ring during installation. It will be appreciated that while in the embodiment of FIGS. 1–4, the protrusion 50 and the recess 39 extend circumferentially completely around the locking collar 50 and inner ring 14, alternatively, the protrusions and recesses may be provided at circumferentially spaced locations.

Referring now to FIG. 5, there is shown an alternative embodiment of the invention wherein items similar to those described above having similar reference numerals with the distinguishing suffix "a" added. In this embodiment, the outer cylindrical surface 45a, defined the finger extension lips 41a, and the inner cylindrical mounting surface 46a of the collar 40a are formed with cooperating detents for releasable snap action inter-engagement and alignment of the components during assembly. In this instance, the inner cylindrical surface 46a of the collar 40a is formed with an outwardly rounded or arcuate-shaped protrusion 50a and the outer surface 45a of the lips 41a is formed with a complimentary shaped recess 60 for receiving the protrusion 50a.

The protrusion 50a preferably is located at a distance from the side of the collar which seats against the inner ring shoulder 38a corresponding substantially to the distance of the recess 60 from the shoulder 38a. The protrusion 50a of the collar 40a again has an inner diameter that is less than the diameter of the finger extension lips 41a with the curved configuration of the arcuate-shaped protrusion 50a serving to cam and force the finger extensions 36a and collar 40a apart during assembly to facilitate snap action engagement therebetween when the collar 40a is properly seated on the inner ring 14a against the shoulder 38a. Again, preliminary factory assembly of the locking collar 40a may be efficiently effected with the collar being properly located in mounted position for final tightening upon subsequent installation of the bearing assembly 10a on a shaft.

Referring now to FIGS. 6 and 7, still another embodiment of the invention is shown, wherein items similar to those described above have been given similar reference numerals with the distinguishing suffix "b" added. In this embodiment, the collar 40b has a generally V-shaped protrusion 50b disposed at the juncture of inner cylindrical surfaces 46b, 60 of the collar 40b. The protrusion 50b again has a smaller internal diameter than the lips 41b of the finger extensions 36b and is forced onto the finger extensions 36b and into the groove 39b with snap action engagement. The inner cylindrical surfaces 46b, 58b of the collar 40b on opposite sides of the protrusion 50b have different diameters so as to both be in close relationship with the cylindrical surface 45b of the finger extension lips 41b and the bottom surface of the groove 39b, respectively.

In contrast to the first and second embodiments of the invention, in this embodiment the protrusion 50b does not extend-around the entire inner annular surface of the collar 40b, but rather, only at discreet points, as shown in FIG. 6. It will be appreciated, however, that the interference between the collar 40b and the finger extensions 36b at these discrete points, which are preferably symmetrically disposed, is sufficient to retain the components together.

Figure 9:
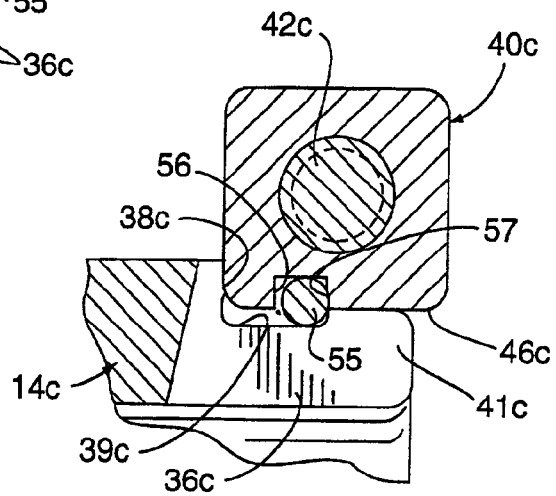
FIG. 9 is an enlarged fragmentary section of the locking collar and inner bearing ring shown in FIG. 8.

Referring now to FIGS. 8–9, there is shown another embodiment of the invention wherein items similar to those described above have been given similar reference numerals with the distinguishing suffix "c" added. In this embodiment, the protrusion of the locking collar 40c is defined by a separate annular resilient member 55 carried within the annular opening of the locking collar 40c. The illustrated annular resilient member 55 is an O-ring disposed within a rectangular groove 56 formed in the inner cylindrical surface 46c of the locking collar and sized so that a portion of the O-ring extends radially inwardly beyond the annular surface 46c to form a resilient protrusion. The cylindrical inner surface 46c of the locking collar preferably is only slightly larger than the outer diameter of the finger extension lips 41c such that upon positioning of the locking collar 40c onto the finger extensions 36c the O-ring 55 is forced substantially into the groove 56 and contained therein until reaching the recess or groove 39c of the finger extensions 36c at which time the O-ring 55 will snap into the recess for locating and retaining the locking collar 40c in preassembled position adjacent the inner ring shoulder 38c. The distance between side of the locking collar positionable against the inner ring shoulder 38c and the locking collar groove 56 corresponds substantially to the axial length of the finger extension groove 39c such that upon snap action engagement of the O-ring 55 into the groove 39c the locking collar 40c is located against the shoulder 38c. Following such preassembly of the locking collar 40c, the locking screw 42c can be tightened to deform the finger extensions 36c into secure engaging relationship with the shaft upon which it is mounted.

Figure 10:
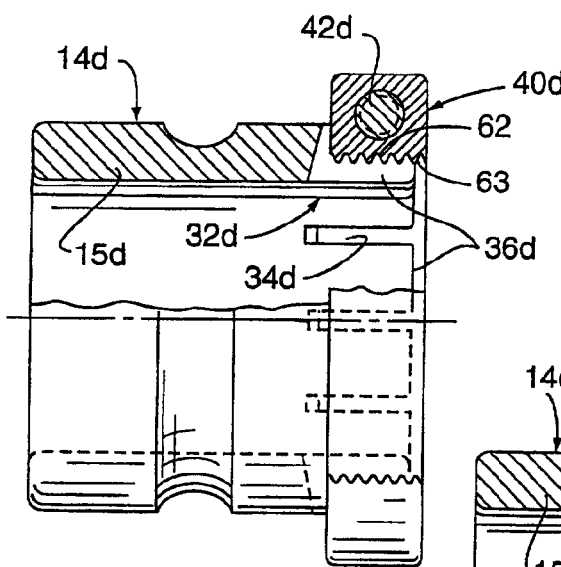
FIG. 10 is still another alternative locking collar mounting and retaining arrangement.
Figure 11:
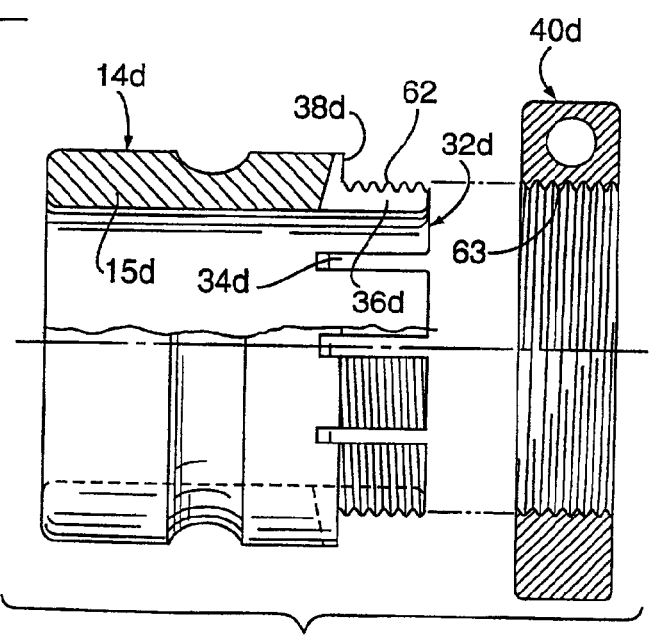
FIG. 11 is an exploded view of the locking collar and inner bearing ring shown in FIG. 10.

Referring now to FIGS. 10–11 still another alternative embodiment of bearing assembly is shown wherein items similar to those described above have been given similar reference numerals with the distinguishing suffix "d" added. In this embodiment, the inner cylindrical surface of the locking collar 40d and the outer surface of the finger extensions 36d are formed with cooperating threads 62, 63, respectively, which enable the locking collar 40d to be rotatably threaded onto the finger extensions 36d until reaching its preassembly position in abutting relation with the inner ring shoulder 38d. The threads 62, 63 in this case form protrusions which retain the locking collar 40d in preassembled position. Again, following such preassembly, tightening of the locking screw 42d will deform the finger extensions into secure engagement with the shaft upon which the bearing assembly is mounted.

In summary, it will be seen from the foregoing that the invention provides a unique bearing assembly locking arrangement wherein the locking collar may be preassembled onto the inner bearing ring in the factory. The locking collar is provided with a protrusion along its inner annular surface, and the finger extensions of the inner ring are provided with a mating groove. Both the groove and the protrusion may be of various sizes and shapes, extending completely or partially along the annular surface, so long as the groove and protrusion are relatively sized so that there is an interference between the components when in their free state. In this way, when the collar is preassembled onto the inner bearing ring, the collar is held in the proper position for subsequent installation and tightening onto a shaft.

We claim:

1. A bearing locking collar for securing an inner ring of a bearing to a shaft comprising:

a compressible annular member having an outer surface, an inner surface, and a first end positioned opposite a second end defining a gap therebetween;

a locking component having a first portion and a second portion, the locking component extending from the first end of the member and into engagement with the second end of the member, such that when the locking component is tightened, the first end and the second end are drawn together to reduce the gap therebetween; and a protrusion extending radially inwardly from the inner surface of the compressible annular member and adapted for engagement with a groove positioned on the inner ring of the bearing.

2. The bearing locking collar of claim 1, wherein the protrusion has a camming surface adapted for guiding said locking collar into a preliminary mounted position on the inner ring of the bearing.

3. The bearing locking collar of claim 1, wherein the protrusion is integrally formed in the annular member.

4. The bearing locking collar of claim 1, wherein the protrusion has a wedge shape.

* * * * *